US011926186B2

United States Patent
Yamazaki et al.

(10) Patent No.: US 11,926,186 B2
(45) Date of Patent: Mar. 12, 2024

(54) SUSPENSION DEVICE

(71) Applicant: HONDA MOTOR CO., LTD., Tokyo (JP)

(72) Inventors: Ryosuke Yamazaki, Wako (JP); Takashi Yanagi, Wako (JP); Kazuya Konada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 75 days.

(21) Appl. No.: 17/681,718

(22) Filed: Feb. 26, 2022

(65) Prior Publication Data

US 2022/0281279 A1    Sep. 8, 2022

(30) Foreign Application Priority Data

Mar. 2, 2021 (JP) .................................. 2021-032239

(51) Int. Cl.
*B60G 17/015* (2006.01)
*F16F 15/03* (2006.01)
*F16F 15/18* (2006.01)

(52) U.S. Cl.
CPC .......... *B60G 17/0157* (2013.01); *F16F 15/03* (2013.01); *F16F 15/18* (2013.01);
(Continued)

(58) Field of Classification Search
CPC .......... B60G 17/0157; B60G 2202/422; B60G 2400/0521; B60G 2400/104;
(Continued)

(56) References Cited

U.S. PATENT DOCUMENTS

2009/0121398 A1* 5/2009 Inoue ................. B60G 17/0157
267/140.14
2014/0238793 A1* 8/2014 Nanbara ................. F16F 15/03
188/267

(Continued)

FOREIGN PATENT DOCUMENTS

CN         1510317 A     7/2004
CN       101382177 A     3/2009
(Continued)

OTHER PUBLICATIONS

Chinese Office Action received in corresponding CN application No. 202210171255.9 dated Jun. 7, 2023 with English translation (20 pages).

*Primary Examiner* — Paul N Dickson
*Assistant Examiner* — Matthew D Lee
(74) *Attorney, Agent, or Firm* — Rankin, Hill & Clark LLP

(57) ABSTRACT

A suspension device includes: a hydraulic damper including a rod provided with a valve for generating a hydraulic pressure when the rod is displaced between a first liquid chamber and a second liquid chamber; and an electric damper configured to electrically displace the rod by an actuator. The electric damper includes: an outer cylinder; an inner cylinder; a piston provided on the rod and configured to stroke in the inner cylinder; and a communication passage disposed inside the inner cylinder at a central portion where the piston strokes. The communication passage establishes communication between the first liquid chamber at one axial end side of the piston and the second liquid chamber at another axial end side of the piston.

5 Claims, 3 Drawing Sheets

(52) U.S. Cl.
CPC ............... *B60G 2202/422* (2013.01); *B60G 2400/0521* (2013.01); *B60G 2400/104* (2013.01); *B60G 2400/202* (2013.01); *B60G 2400/252* (2013.01); *B60G 2500/10* (2013.01); *B60G 2600/184* (2013.01); *B60G 2800/162* (2013.01); *B60G 2800/702* (2013.01)

(58) Field of Classification Search
CPC ........ B60G 2400/202; B60G 2400/252; B60G 2500/10; B60G 2600/184; B60G 2800/702; B60G 13/02; F16F 15/03; F16F 15/18; F16F 9/185; F16F 9/3257
See application file for complete search history.

(56) References Cited

U.S. PATENT DOCUMENTS

2015/0076773 A1* 3/2015 Kasuga ............. B60G 17/0155
280/5.514

2019/0264771 A1* 8/2019 Sakka ..................... F16F 9/18
2023/0037678 A1* 2/2023 Konada ................ F16F 15/002

FOREIGN PATENT DOCUMENTS

| | | | | |
|---|---|---|---|---|
| CN | 205423667 U | * | 8/2016 | |
| CN | 205533965 U | * | 8/2016 | |
| EP | 1995090 A2 | * | 11/2008 | ............ B60G 13/14 |
| JP | H10-292847 A | | 11/1998 | |
| JP | 10331893 A | * | 12/1998 | |
| JP | 2002-227927 A | | 8/2002 | |
| JP | 2008143436 A | * | 6/2008 | |
| JP | 2008260321 A | * | 10/2008 | |
| JP | 2012091763 A | * | 5/2012 | |
| JP | 2012111360 A | * | 6/2012 | |
| JP | 2012-236582 A | | 12/2012 | |
| JP | 2014-149003 A | | 8/2014 | |
| JP | 2019-128031 A | | 8/2019 | |
| WO | WO-2009063798 A1 | * | 5/2009 | ......... B60G 17/0162 |

* cited by examiner

SUSPENSION DEVICE

CROSS-REFERENCE TO RELATED APPLICATION

This application claims the benefit of foreign priority to Japanese Patent Application No. 2021-032239, filed on Mar. 2, 2021, which is incorporated by reference in its entirety.

TECHNICAL FIELD

The present invention relates to a suspension device.

BACKGROUND

JP 2002-227927 A discloses that a hydraulic damper is housed inside an electromagnetic damper. The piston of the hydraulic damper is provided with a fluid passage and a pin inserted therein. The damping force of the hydraulic damper decreases in a normal stroke because a pin reduced diameter portion of the pin faces the fluid passage and a relatively large gap is formed. Meanwhile, the damping force of the hydraulic damper increases in an end-side stroke region because a large diameter portion of the pin faces the fluid passage.

As described above, according to the technique of JP 2002-227927 A, the electromagnetic damper and the hydraulic damper are adjusted using the reduced diameter portion and the large diameter portion of the pin. According to this configuration, the structure of the damper is large and complicated as a whole.

In view of the above, it is an object of the present invention to provide a suspension device that can be downsized as a whole and simple in configuration.

SUMMARY

According to one aspect of the present invention, there is provided a suspension device comprising: a hydraulic damper including a rod provided with a valve for generating a hydraulic pressure when the rod is displaced between a first liquid chamber and a second liquid chamber; and an electric damper configured to electrically displace the rod by an actuator. The electric damper includes: an outer cylinder; an inner cylinder; a piston provided on the rod and configured to stroke in the inner cylinder; and a communication passage disposed inside the inner cylinder at a central portion where the piston strokes, the communication passage establishing communication between the first liquid chamber at one axial end side of the piston and the second liquid chamber at another axial end side of the piston.

BRIEF DESCRIPTION OF THE DRAWINGS

The drawings described herein are for illustration purposes only and are not intended to limit the scope of the present invention in any way.

DETAILED DESCRIPTION

Two exemplary embodiments of the present invention ae described below.

First Embodiment

Figure 1:
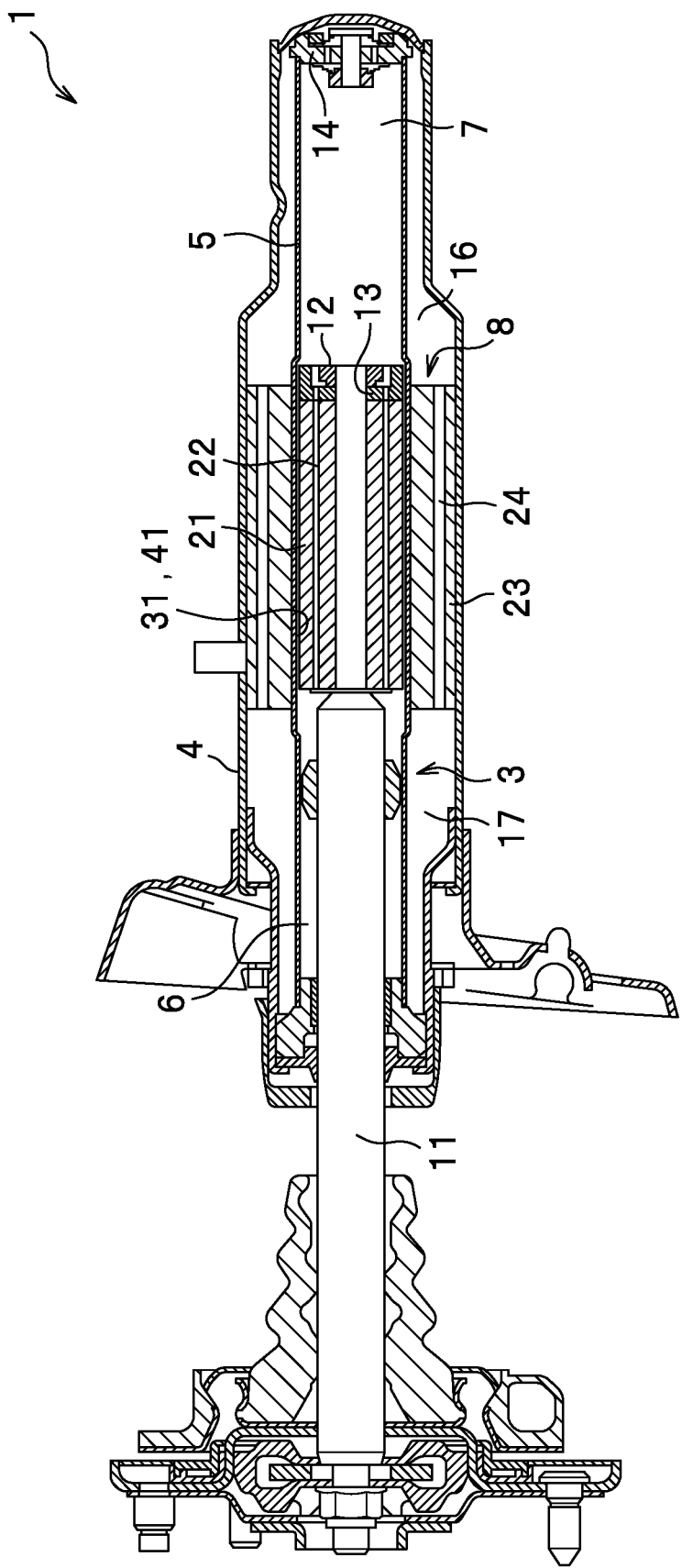
FIG. 1 is a cross sectional view of a suspension device according to a first embodiment of the present invention.

FIG. 1 is a cross sectional view of a suspension device according to one embodiment of the present invention. Hereinafter, the right (front) side of the suspension device 1 shown in FIG. 1 may be referred to as a front side. The left side of the suspension device 1 shown in FIG. 1 may be referred to as a rear side.

The suspension device 1 includes a hydraulic damper 3. The hydraulic damper 3 includes a rod 11, a piston 12, valves 13 and 14, and the like. The hydraulic damper 3 functions as a conventional suspension. In other words, an inner cylinder 5 is housed inside an outer cylinder 4 serving as an outer casing of the suspension device 1. The rod 11 coaxial with the inner cylinder 5 is housed inside the inner cylinder 5. The rod 11 is movable inside the inner cylinder 5 in the longitudinal direction of the inner cylinder 5 (right-left direction in FIG. 1). The piston 12 is provided on the longitudinally front side (right side) of the rod 11. The outer peripheral surface of the piston 12 moves along the inner peripheral surface of the inner cylinder 5.

The piston 12 partitions the inside of the inner cylinder 5 into a first liquid chamber 6 disposed on the rear side of the piston 12 and a second liquid chamber 7 disposed on the front side of the piston 12. The piston 12 is provided with a cylindrical magnet 21, and the magnet 21 is provided with an in-magnet flow passage 22 (orifice) that establishes communication between the first liquid chamber 6 and the second liquid chamber 7. A valve 13 is provided at a head portion of the piston 12 in the in-magnet flow passage 22. A valve 14 is provided at a head portion of the inner cylinder 5. The valve 14 can establish communication between the inside of the inner cylinder 5, and a space 16 between the inner cylinder 5 and the outer cylinder 4. The space formed in the suspension device 1 is filled with liquid such as oil. When the rod 11 is displaced between the first liquid chamber 6 and the second liquid chamber 7 with the valves 13 and 14 open, the liquid flows through the in-magnet flow passage 22 and the valves 13 and 14. This causes the piston 12 to move, so that the hydraulic damper 3 can generate a hydraulic pressure.

The suspension device 1 also includes an electric damper 8 (electromagnetic damper). The electric damper 8 includes the magnet 21, a coil 23, and the like. The electric damper 8 functions as an electromagnetic suspension. The cylindrical coil 23 (actuator) is provided between the outer cylinder 4 and the inner cylinder 5. When the coil 23 is energized, a magnetic field is generated, and the magnetic field acts on the magnet 21, so that the piston 12 and also the rod 11 can move in the axial directions thereof. An in-coil passage 24 (orifice) is provided in the coil 23. The in-coil passage 24 establishes communication between the spaces 16 and 17 located respectively in the front and rear of the coil 23 that is disposed between the outer cylinder 4 and the inner cylinder 5.

Figure 2:
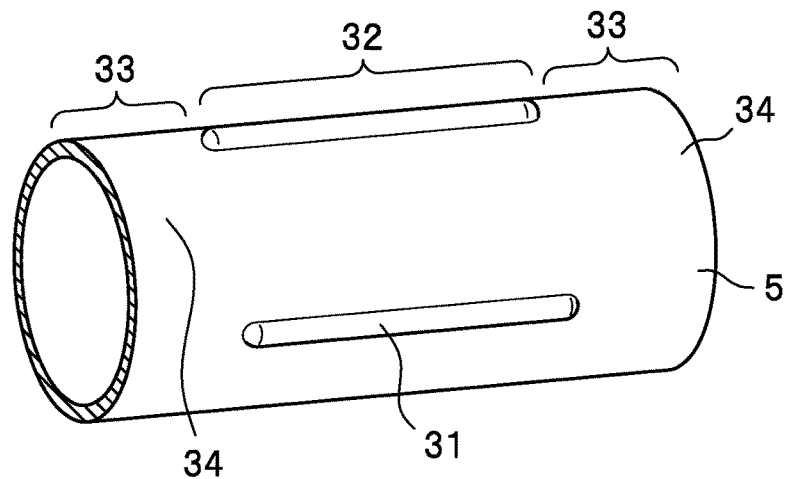
FIG. 2 is a perspective view illustrating a longitudinal central portion of an inner cylinder in the suspension device according to the first embodiment of the present invention.

FIG. 2 is a perspective view illustrating a longitudinal central portion of the inner cylinder. In the inner cylinder 5, a plurality of grooves 31 are formed inside the longitudinal central portion at a position where the piston 12 strokes. The plurality of grooves 31 extend in a longitudinal direction that is the lengthwise direction of the inner cylinder 5. When the piston 12 passes by these grooves 31, the piston 12 does not pass through the grooves 31, so that a space is remained in the grooves 31. In other words, the grooves 31 serve as a communication passage for establishing communication between the first liquid chamber 6 at one axial end of the piston 12 and the second liquid chamber 7 at the other axial end of the piston 12. In FIGS. 1 and 2, the grooves 31 are formed in the section of an inner cylinder central portion 32. As illustrated in FIG. 2, no grooves are formed in the inner cylinder 5 at the sections of both end portions 33 that are located on both sides of the inner cylinder central portion 32.

As is apparent from the above, the electric damper 8 is an electromagnetic damper that uses magnetic force generated by a linear motor including the magnet 21, the coil 23, and the like.

Next, the operation of the present embodiment will be described.

Figure 3A:
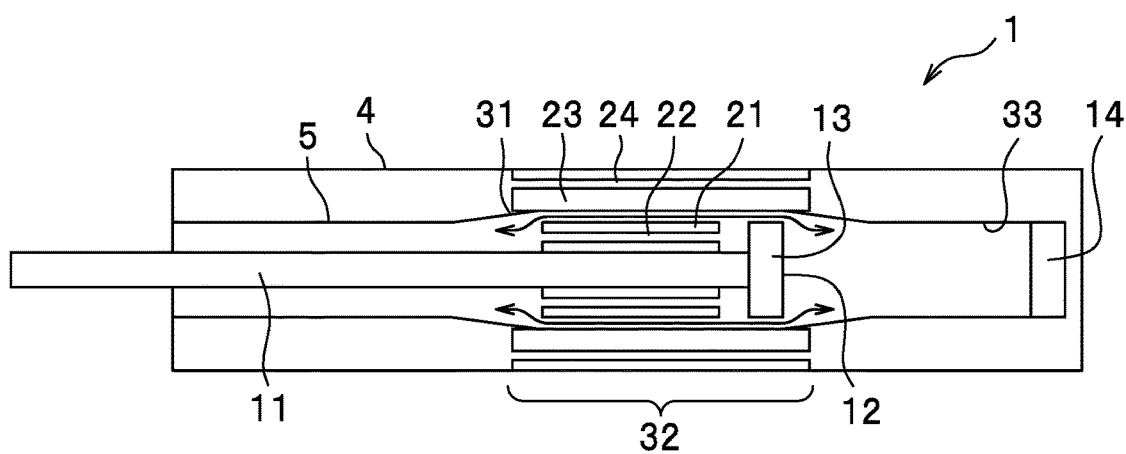
FIG. 3A is a conceptual diagram of the suspension device for explaining the operation of the suspension device according to the first embodiment of the present invention.
Figure 3B:
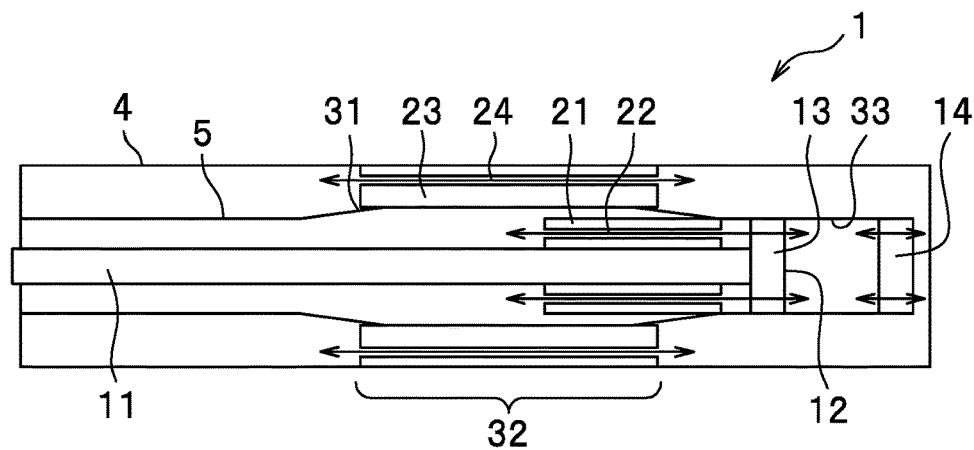
FIG. 3B is a conceptual diagram of the suspension device for explaining the operation of the suspension device according to the first embodiment of the present invention.

FIGS. 3A and 3B are conceptual diagrams of the suspension device for explaining the operation of the suspension device according to the first embodiment. As illustrated in FIG. 3A, the piston 12 is located in the central portion of the inner cylinder 5 when the piston 12 is present in the section of the inner cylinder central portion 32. In this case, the valve 13 and the grooves 31 are located opposite to each other in the radial direction of the inner cylinder 5 (i.e., the valve 13 and the grooves 31 overlap each other in the radial direction of the inner cylinder 5) at the position of the valve 13. Since the fluid passes through the grooves 31 as indicated by the arrows, the damping force of the hydraulic damper 3 is extremely small. Thus, the electric damper 8 is driven when the piston 12 is present in the section of the inner cylinder central portion 32. This section of the inner cylinder central portion 32 is the section through which the piston 12 passes most frequently.

As illustrated in FIG. 3B, the piston 12 is located in an end portion of the inner cylinder 5 when the piston 12 is present in the section of the both end portions 33 where grooves 31 are not formed. In this case, the valve 13 is present but the grooves 31 are not present in the radial direction of the inner cylinder 5 (i.e., the valve 13 and the grooves 31 do not overlap each other and thus they are not located opposite to each other in the radial direction of the inner cylinder 5) at the position of the valve 13. In this case, the fluid passes through the valves 13 and 14 and flows as indicated by the arrows, and the damping force of the hydraulic damper 3 is similar to that of the conventional hydraulic damper. In other words, the hydraulic damper 3 is driven when the piston 12 is located in both end portions 33. Both end portions 33 are sections through which the piston passes infrequently.

Accordingly, since the electric damper 8 is driven only in the inner cylinder central portion 32 that is the section where the piston 12 passes frequently, the number of components such as magnets 21 and coils 23 can be reduced, so that the manufacturing cost of the suspension device 1 can be reduced.

Further, since it is only required to form the grooves 31 in the inner cylinder 5, the suspension device 1 can be downsized as a whole and simple in configuration.

Further, providing the in-magnet flow passage 22 (orifice) and the in-coil passage 24 (orifice) using portions where the magnet 21 and the coil 23 are provided makes it possible to make the outer shape of the entire electric damper 8 thinner.

Furthermore, since it is only required to form the grooves 31 in the inner cylinder 5, a bypass passage (grooves 31) can be formed between the inner cylinder 5 and the piston 12 while the distance between the magnet 21 and the coil 23 are shortened.

Second Embodiment

In the second embodiment, description is mainly made to differences from the first embodiment. The same reference numerals are given to parts common to those of the first embodiment, and duplicated description thereof is omitted.

Figure 4:
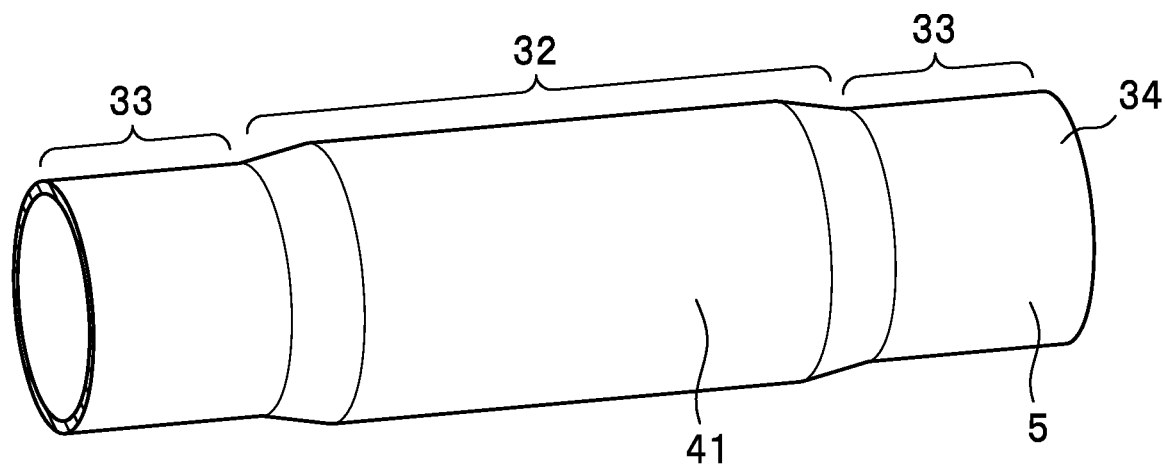
FIG. 4 is a perspective view illustrating a longitudinal central portion of an inner cylinder in the suspension device according to a second embodiment of the present invention.

FIG. 4 is a perspective view illustrating a longitudinal central portion of an inner cylinder. As illustrated in FIGS. 1 and 4, the diameter of the inside of the inner cylinder 5 is enlarged at a position where the piston 12 strokes. The inner cylinder 5 has an enlarged inner diameter at the inside of a longitudinal central portion (inner cylinder central portion 32) where the piston 12 strokes. When the piston 12 passes by this enlarged diameter portion 41, the piston 12 does not pass through the enlarged portion of the enlarged diameter portion 41, so that a space is remained in the enlarged portion of the enlarged diameter portion 41. In other words, the enlarged portion of the enlarged diameter portion 41 serves as a communication passage for establishing communication between the first liquid chamber 6 at one axial end of the piston 12 and the second liquid chamber 7 at the other axial end of the piston 12. In FIGS. 1 and 4, the enlarged diameter portion 41 is formed in the section of the inner cylinder central portion 32. As illustrated in FIG. 4, no enlarged portion is formed in the regions 34 of the inner cylinder 5 at the sections of both end portions 33 that are located on both sides of the inner cylinder central portion 32.

Next, the operation of the second embodiment will be described.

As illustrated in FIG. 3A, the piston 12 is located in the central portion of the inner cylinder 5 when the piston 12 is present in the section of the inner cylinder central portion 32. In this case, the valve 13 and the enlarged portion of the enlarged diameter portion 41 are located opposite to each other in the radial direction of the inner cylinder 5 (i.e., the valve 13 and the enlarged portion of the enlarged diameter portion 41 overlap each other in the radial direction of the inner cylinder 5) at the position of the valve 13. Since the fluid passes through the enlarged portion of the enlarged diameter portion 41 as indicated by the arrows, the damping force of the hydraulic damper 3 is extremely small. Thus, the electric damper 8 is driven when the piston 12 is present in the section of the inner cylinder central portion 32. This section of the inner cylinder central portion 32 is the section through which the piston 12 passes most frequently.

As illustrated in FIG. 3B, the piston 12 is located in an end portion of the inner cylinder 5 when the piston 12 is present in the section of the both end portions 33 where the enlarged diameter portion 41 is not formed. In this case, the valve 13 is present but the enlarged diameter portion 41 is not present in the radial direction of the inner cylinder 5 (i.e., the valve 13 and the enlarged portion of the enlarged diameter portion 41 do not overlap each other and thus they are not located opposite to each other in the radial direction of the inner cylinder 5) at the position of the valve 13. In this case, the fluid passes through the valves 13 and 14 and flows as indicated by the arrows, and the damping force of the hydraulic damper 3 is similar to that of the conventional hydraulic damper. In other words, the hydraulic damper 3 is driven when the piston 12 is located in both end portions 33. Both end portions 33 are sections through which the piston passes infrequently.

Accordingly, since the electric damper 8 is driven only in the inner cylinder central portion 32 that is the section where the piston 12 passes frequently, the number of components such as magnets 21 and coils 23 can be reduced, so that the manufacturing cost of the suspension device 1 can be reduced.

Further, since it is only required to form the enlarged diameter portion 41 in the inner cylinder 5, the suspension device 1 can be downsized as a whole and simple in configuration.

Further, providing the in-magnet flow passage 22 (orifice) and the in-coil passage 24 (orifice) using portions where the magnet 21 and the coil 23 are provided makes it possible to make the outer shape of the entire electric damper 8 thinner.

Further, the amount of the liquid bypassing (i.e., flowing through the enlarged portion of the enlarged diameter portion 41) can be increased by enlarging the inner cylinder as a whole. Moreover, enlarging the diameter of the inner cylinder as a whole is simple in molding and improves productivity.

It should be noted that means for providing the communication passage in the inner cylinder central portion 32 as described above are not limited to the configurations such as formation of the grooves 31 in the first embodiment and formation of the enlarged diameter portion 41 in the second embodiment, and other means may be used.

What is claimed is:

1. A suspension device comprising:
a hydraulic damper including a rod provided with a valve for generating a hydraulic pressure when the rod is displaced between a first liquid chamber and a second liquid chamber; and
an electric damper configured to electrically displace the rod by an actuator, wherein the electric damper is an electromagnetic damper that uses magnetic force generated by a linear motor and the electric damper includes:
an outer cylinder;
an inner cylinder;
a piston provided on the rod and configured to stroke in the inner cylinder;
a communication passage disposed inside the inner cylinder at a central portion where the piston strokes, the communication passage establishing communication between the first liquid chamber at one axial end side of the piston and the second liquid chamber at another axial end side of the piston;
a coil; and
a magnet,
wherein at least one of the coil or the magnet has an orifice.

2. A suspension device comprising:
a hydraulic damper including a rod provided with a valve for generating a hydraulic pressure when the rod is displaced between a first liquid chamber and a second liquid chamber; and
an electric damper configured to electrically displace the rod by an actuator, wherein the electric damper includes:
an outer cylinder;
an inner cylinder;
a piston provided on the rod and configured to stroke in the inner cylinder; and
a communication passage disposed inside the inner cylinder at a central portion where the piston strokes, the communication passage establishing communication between the first liquid chamber at one axial end side of the piston and the second liquid chamber at another axial end side of the piston,
wherein the communication passage is a groove formed inside the inner cylinder.

3. A suspension device comprising:
a hydraulic damper including a rod provided with a valve for generating a hydraulic pressure when the rod is displaced between a first liquid chamber and a second liquid chamber; and
an electric damper configured to electrically displace the rod by an actuator, wherein the electric damper includes:
an outer cylinder;
an inner cylinder;
a piston provided on the rod and configured to stroke in the inner cylinder; and
a communication passage disposed inside the inner cylinder at a central portion where the piston strokes, the communication passage establishing communication between the first liquid chamber at one axial end side of the piston and the second liquid chamber at another axial end side of the piston,
wherein the communication passage is formed by an enlarged inner diameter portion of the inner cylinder.

4. The suspension device according to claim 2, wherein the electric damper is an electromagnetic damper that uses magnetic force generated by a linear motor.

5. The suspension device according to claim 3, wherein the electric damper is an electromagnetic damper that uses magnetic force generated by a linear motor.

* * * * *